Oct. 21, 1958 S. LEECH 2,856,721
FISHING ALARM
Filed Feb. 6, 1958

INVENTOR.
STANLEY LEECH
BY W. A. Fraser
ATTY.

United States Patent Office 2,856,721
Patented Oct. 21, 1958

2,856,721

FISHING ALARM

Stanley Leech, Sarasota, Fla.

Application February 6, 1958, Serial No. 713,758

10 Claims. (Cl. 43—17)

This invention relates to fishing devices and has for its principal object the provision of a simple spring tensioned alarm device to indicate the presence of a fish caught on a fishing line.

Another object of the device is to provide a heavy-duty construction suitable for trolling for the heavier species of fish.

In trolling for large salt-water fish, for example, a fishing boat may put out as many as four and five or more lines, and the present device makes it possible to tend a number of such lines without actually holding the line to determine when a catch is made. A fish once caught contines to operate the alarm until the tension on the line is relieved by the fisherman retrieving the line to bring in the fish.

Figure 1:
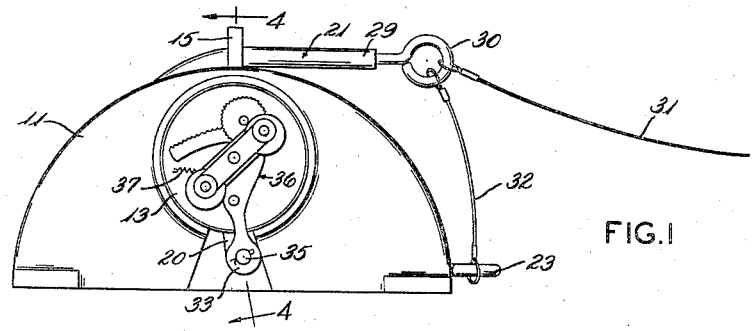
Fig. 1 is a side elevation illustrating a device embodying the invention.

The device comprises a housing 11 which may be bolted to the rail or deck 12 of a boat; although in a lighter construction, the device may be fastened to a dock, or a post on land, or to a fishing pole which may be left unattended until a fish strikes.

In the sides of housing 11 are mounted two bells 13 and 14 of the ordinary spring tension type used as bicycle bells. It will be understood that only one bell may be employed although two are illustrated and used for the sake of balance.

An operating lever 15 is pivoted in the housing on shaft 16 extending into bearing lugs 17 and 18 in housing 11. Lever 15 is provided at its upper end with an aperture or bifurcation 19, while at the lower end of the other side of its pivotal mounting the lever is provided with another aperture or bifurcation 20.

A spring member 21 is anchored internally at one end thereof 22 to the inside of casing 11 by means of a bolt or screw eye 23 which is affixed to the casing. The spring member then extends through the lower aperture or bifurcation 20 of the operating lever 15, then around pulley 24 journaled in the side of the casing opposite end 22 of the spring member. The latter then extends around the pulley and through the aperture or bifurcation 19 in the top end of operating lever 15 and finally extends out of the casing through an elongated opening 25 in the top thereof. The opening has a laterally widened portion 26 with shoulders 27, 27 at the end of said opening toward the stern of the boat as the housing is mounted, the shoulders 27, 27 serving as stops for operating lever 15 as it abuts against said shoulders when the lever is pulled toward the stern when a fish is hooked.

Similarly, the end of opening enlargement 26 toward the bow of the boat is provided with shoulders 28, 28 serving as abutments to retain lever 15 in a vertical position, limiting its spring-tensioned return motion which will be described hereinafter.

The free end 29 of spring member 21 has attached thereto a bolt or screw eye 30 to which may be attached a fishing line 31. As a safety measure, to prevent the over-stretching or breaking of spring member 21, there is provided a wire cable or link 32 connecting screw eye 23 and screw eye 30.

Bells 13 and 14 are each respectively provided with the usual bell-ringing levers 33 and 34, adjacent the ends of which is journaled a pin 35 which extends through the lower end of operating lever 15 adjacent the aperture or bifurcation 20 and extends laterally through the bell-ringing levers 33 and 34. Each of the bells is provided with the usual internal rack and pinion gear 36 and spring 37.

Spring member 21 may be a length of helical steel spring, but I prefer to use instead a length of high-tensile strength gum rubber tubing. A coiled wire cable 38 may extend through the tubing of spring member 21 to serve as a limiting stop to prevent further extension of the spring member.

In the operation of the device, fishing line complete with hook, bait and sinker (not shown) is thrown overboard while trolling, or, if preferred, while still fishing, the inboard end of the fishing line is tied to screw eye 30 in the free end of spring member 21. The spring member or tubing is of such a size as to make a snug fit in aperture or bifurcation 19 in the upper end of the operating lever 15.

Similarly, the spring member as passed through the aperture or bifurcation 20 makes a tight fit in the lower end of the operating lever. The tension on spring member 21 as well as tension spring 37 of the bell mechanism will retain operating lever 15 in a vertical position against abutments 28, 28 when the fishing line 31 is under normal trolling tension.

Figure 2:
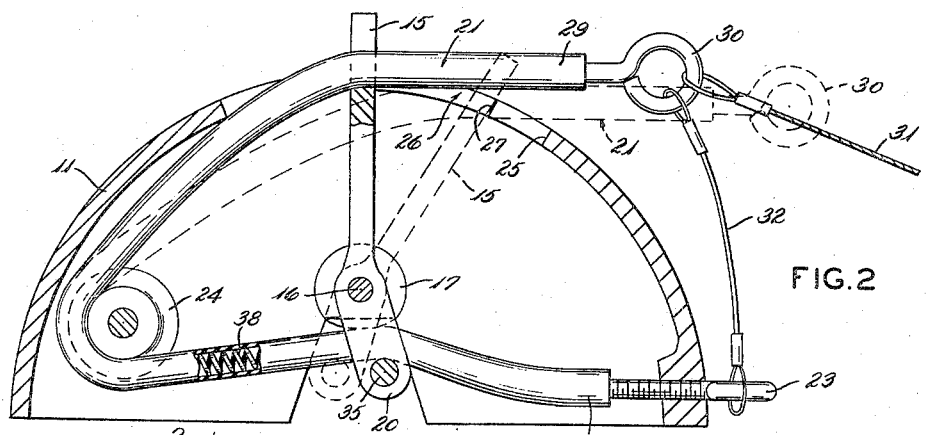
Fig. 2 is a corresponding longitudinal section illustrating the internal mechanism of the device, taken on the line 2—2 of Fig. 3.
Figures 3, 4:
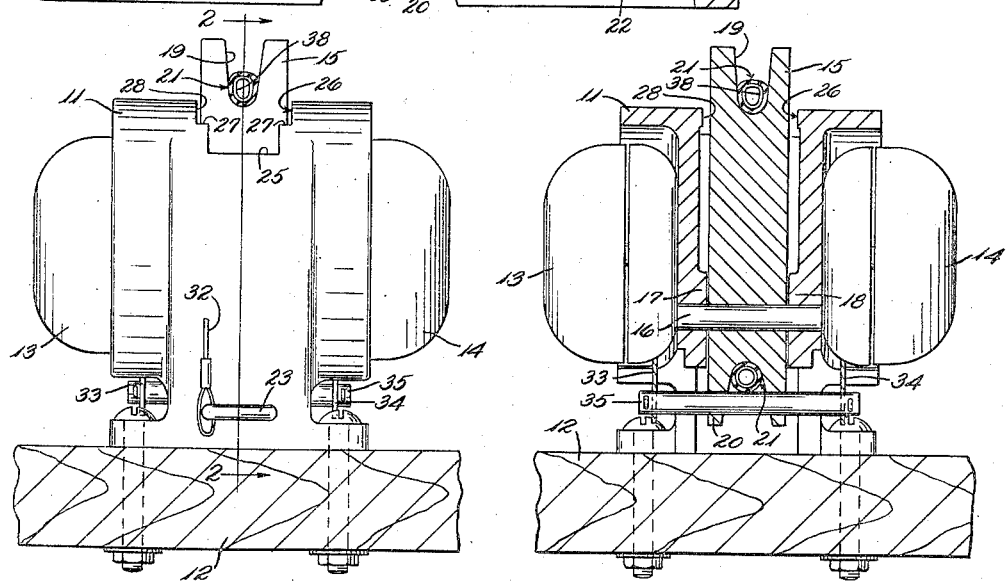
Fig. 3 is a front elevation of the device as fastened to the deck or rail of a boat.
Fig. 4 is a corresponding transverse view, partly in section, taken on the line 4—4 of Fig. 1.

When a fish is hooked, the additional tension on spring member 21 causes it to elongate and move operating lever 15 toward the stern against abutments 27, 27 as shown in the dotted line position in Fig. 2. As the fish fights to free itself from the line, tension is alternately exerted and released against spring member 21 and operating lever 15 so that there is a continual motion and ringing of the bells to warn the fisherman that a fish is on the line ready to be retrieved. Likewise, if an obstruction or patch of weeds is hit by the line, there will be at least one tug on the line to ring the bell and indicate to the fisherman that the line should be drawn in to free it from the obstruction or weeds.

While the device is normally of rugged construction for heavy-duty fishing for large fish, it will be understood that it may be constructed lightly with a light operating spring member and even a single bell for small fishing.

It is recognized that many such fishing alarms have been patented and employed over many years, nevertheless it is believed that the present design embodies a number of improvements which make it more practical, more simple in construction, and more rugged for the purpose, therefore affords the new, inventive and useful features defined in the attached claims.

What is claimed is:

1. A fishing alarm comprising a housing having an elongated opening in the top thereof provided with opposed pairs of abutment shoulders adjacent the respective ends of said opening, a pair of spring actuated alarm bells attached respectively to said housing, opposite sides of said alarm bells each having actuating levers projecting therefrom, an operating lever pivoted to the central portion of said housing and having upper and lower bifurcated ends, said lower end being pivoted to each of actuating levers on said alarm bells, the upper end of said operating lever extending through said top opening in said housing and being adapted to swing into abutting engagement with one pair of said abutment shoulders at one end of its stroke and to swing into abutting engagement with the other pair of abutment shoulders at the other end of the stroke of said operating lever, spring means comprising a length of rubber tubing having a fixed end attached to one end of the interior of said housing, a pulley being mounted in said housing opposite the fixed end of said rubber tubing spring means, said rubber tubing spring means extending from said fixed end through the bifurcation in the lower end of said operating lever, then around said pulley and through the bifurcation in the upper end of said operating lever, and then extending outside said housing to a free end of said rubber tubing spring means, which latter end is adapted to be fastened to a fishing line, the rubber tubing spring means having slidable frictional engagement with the bifurcated ends of said operating lever, so that added tension on said fishing line, rubber tubing spring means, and bell-actuating spring means caused by catching a fish, will overcome the tension of all of said spring means to pull the operating lever and actuate said alarm bell, and then the release of the tension on the fishing line in the playing of the fish will permit said spring means to retract the operating lever, whereby the latter will be reciprocated back and forth between its abutments, thereby continuously ringing said bell.

2. A fishing alarm comprising a housing having an opening in the top thereof, a spring actuated alarm bell attached to said housing having actuating means projecting therefrom, an operating lever pivoted to the central portion of said housing and having upper and lower bifurcated ends, said lower end being pivoted to the actuating means on said alarm bell, the upper end of said operating lever extending through said top opening in said housing, spring means comprising a length of rubber tubing having a fixed end attached to one end of the interior of said housing, a pulley being mounted in said housing opposite the fixed end of said rubber tubing spring means, said rubber tubing spring means extending from said fixed end through the bifurcation in the lower end of said operating lever, then around said pulley and through the bifurcation in the upper end of said operating lever, and then extending outside said housing to a free end of said rubber tubing spring means, which latter end is adapted to be fastened to a fishing line, the rubber tubing spring means having slidable fractional engagement with the bifurcated ends of said operating lever, so that a tension on said fishing line, rubber tubing spring means, and bell-actuating spring means, will overcome the tension of all of said spring means to pull the operating lever and actuate said alarm bell, and then the release of the tension on the fishing line in the playing of the fish will permit said spring means to retract the operating lever, whereby the latter will be reciprocated back and forth, thereby continuously ringing said bell.

3. A fishing alarm comprising a housing having an opening in the top thereof, a spring actuated alarm bell attached to said housing having actuating means projecting therefrom, an operating lever pivoted to the central portion of said housing and having upper and lower ends each provided with openings, said lower end being pivoted to the actuating means on said alarm bell, the upper end of said operating lever extending through said top opening in said housing, spring means comprising a length of rubber tubing having a fixed end attached to one end of the interior of said housing, a pulley being mounted in said housing opposite the fixed end of said rubber tubing spring means, said rubber tubing spring means extending from said fixed end through the opening in the lower end of said operating lever, then around said pulley and through the opening in the upper end of said operating lever, and then extending outside said housing to a free end of said rubber tubing spring means, which latter end is adapted to be fastened to a fishing line, the rubber tubing spring means having slidable frictional engagement with the openings in the ends of said operating lever, so that a tension on said fishing line, rubber tubing spring means, and bell-actuating spring means, will overcome the tension of all of said spring means to pull the operating lever and actuate said alarm bell, and then the release of the tension on the fishing line in the playing of the fish will permit said spring means to retract the operating lever, whereby the latter will be reciprocated back and forth, thereby continuously ringing said bell.

4. A fishing alarm comprising a housing having an elongated opening in the top thereof, a spring actuated alarm bell attached to said housing having actuating means projecting therefrom, an operating lever pivoted to the central portion of said housing and having upper and lower apertured ends, said lower end being pivoted to the actuating means on said alarm bell, the upper end of said operating lever extending through said top opening in said housing, spring means comprising a length of rubber tubing having a fixed end attached to one end of the interior of said housing, a pulley being mounted in said housing opposite the fixed end of said rubber tubing spring means, said rubber tubing spring means extending from said fixed end through the aperture in the lower end of said operating lever, then around said pulley and through the aperture in the upper end of said operating lever, and then extending outside said housing to a free end of said rubber tubing spring means, which latter end is adapted to be fastened to a fishing line, the rubber tubing spring means having slidable frictional engagement with the apertures in the ends of said operating lever, so that a tension on said fishing line, rubber tubing spring means, and bell-actuating spring means, will overcome the tension of all of said spring means to pull the operating lever and actuate said alarm bell.

5. A fishing alarm comprising a housing, a rack and pinion actuated alarm bell attached to said housing having pivoted actuating means projecting therefrom adapted to swing and ring said bell on forward and reverse strokes, an operating lever pivoted to the central portion of said housing to swing therein and having upper and lower apertured ends, said lower end being pivoted to the actuating means on said alarm bell, elongated spring means comprising a length of tensionable spring material having a fixed end attached to one end of the interior of said housing, a pulley being mounted in said housing opposite the fixed end of said spring means, said spring means extending from said fixed end through the apertured lower end of said operating lever, then around said pulley and through the apertured upper end of said operating lever, and then extending outside said housing to a free end thereof, which latter end is adapted to be fastened to a fishing line, the spring means having engagement with the apertured ends of said operating lever, so that added tension and release of tension on said fishing line and spring means will swing the operating lever to actuate said alarm bell by pulling the lower end of said operating lever in a direction opposite to the pull of said fishing line and simultaneously pulling the upper end of said operating lever in the same direction as the pull of said fishing line, the tension of said elongated spring means retracting and swinging the ends of the operating lever in the opposite directions when the play of the fish releases tension on the fishing line, the action maintaining the tension on the fish and at the same time ringing the alarm bell on both the forward and rearward strokes of the alarm bell actuating lever.

6. A fishing alarm comprising a housing, an alarm bell attached to said housing having actuating means projecting therefrom, an operating lever pivoted to the central portion of said housing to swing therein and having upper and lower apertured ends, said lower end being pivoted to the actuating means on said alarm bell, spring means comprising a length of rubber tubing having a fixed end attached to one end of the interior of said housing, a pulley being mounted in said housing opposite the fixed end of said rubber tubing spring means, said rubber tubing spring means extending from said fixed end through the apertured lower end of said operating lever, then around said pulley and through the apertured upper end of said operating lever, and then extending outside said housing to a free end thereof, which latter end is adapted to be fastened to a fishing line, the rubber tubing spring means having slidable frictional engagement with the apertured ends of said operating lever, so that a tension on said fishing line and rubber tubing spring means will overcome the tension of said spring means to pull the operating lever and actuate said alarm bell.

7. A fishing alarm comprising a housing having a spring actuated alarm bell attached thereto, an operating lever pivoted to said housing and having one end thereof pivoted to actuating means on said alarm bell, spring means having one end fixed to said housing, said spring means being slidably attached by frictional engagement to said lever arm, and a free end on said spring means provided with means for attaching a fishing line to the end thereof, whereby as the spring means is tensioned by a drag on the fishing line, the operating lever will be displaced by the frictional engagement and the alarm bell will be actuated thereby.

8. A fishing alarm comprising a housing, an alarm bell attached to said housing having actuating means projecting therefrom, an operating lever pivoted to the central portion of said housing to swing therein and having upper and lower apertured ends, said lower end being pivoted to the actuating means on said alarm bell, spring means comprising a length of rubber tubing having a fixed end attached to one end of the interior of said housing, said rubber tubing spring means extending from said fixed end through the apertured lower end of said operating lever and through the apertured upper end of said operating lever, and then extending outside said housing to a free end thereof, which latter end is adapted to be fastened to a fishing line, the rubber tubing spring means having slidable frictional engagement with the apertured ends of said operating lever, so that a tension on said fishing line and rubber tubing spring means will overcome the tension of said spring means to pull the operating lever and actuate said alarm bell.

9. A fishing alarm comprising a housing, an alarm bell attached to said housing having actuating means projecting therefrom, an operating lever pivoted to said housing to swing therein and having upper and lower ends, said lower end being pivoted to the actuating means on said alarm bell, spring means having a fixed end attached to said housing, said spring means extending from said fixed end through the lower end of said operating lever and through the upper end of said operating lever, and then extending outside said housing to a free end thereof, which latter free end is adapted to be fastened to a fishing line, the spring means engagement with the apertured ends of said operating lever being such that tension caused by a fish on said fishing line will overcome the tension of said spring means to pull the operating lever to actuate said alarm bell.

10. A fishing alarm comprising an alarm bell having actuating means projecting therefrom, an operating lever pivoted to actuating means to swing and ring said alarm bell, spring means having a fixed end and extending from said fixed end through the lower end of said operating lever and through the upper end of said operating lever, and then extending outside said housing to a free end adapted to be fastened to a fishing line, the spring means engagement with the apertured ends of said operating lever being such that tension caused by a fish on said fishing line will overcome the tension of said spring means to pull the operating lever to actuate said alarm bell.

No references cited.